(12) United States Patent
Mizes et al.

(10) Patent No.: US 10,052,823 B2
(45) Date of Patent: Aug. 21, 2018

(54) SYSTEM AND METHOD FOR TEST PATTERN FORMATION DURING THREE-DIMENSIONAL OBJECT PRINTING

(71) Applicant: Xerox Corporation, Norwalk, CT (US)

(72) Inventors: Howard A. Mizes, Pittsford, NY (US); Brian R. Conrow, Webster, NY (US); Patricia J. Donaldson, Pittsford, NY (US); Jeffrey J. Folkins, Rochester, NY (US); Paul A. Hosier, Rochester, NY (US); Robert J. Kleckner, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 661 days.

(21) Appl. No.: 14/509,827

(22) Filed: Oct. 8, 2014

(65) Prior Publication Data
US 2016/0101568 A1    Apr. 14, 2016

(51) Int. Cl.
*B29C 67/00*    (2017.01)
*B29C 64/393*   (2017.01)
*B33Y 10/00*    (2015.01)
*B33Y 50/02*    (2015.01)
G06F 19/00      (2018.01)
B29L 31/00      (2006.01)
B29K 101/12     (2006.01)

(52) U.S. Cl.
CPC ........ *B29C 67/0088* (2013.01); *B29C 64/393* (2017.08); *B29C 67/0059* (2013.01); *B33Y 10/00* (2014.12); *B33Y 50/02* (2014.12); *B29K 2101/12* (2013.01); *B29L 2031/772* (2013.01)

(58) Field of Classification Search
CPC ................. B29C 67/0059; B29C 67/0088
See application file for complete search history.

(56) References Cited

U.S. PATENT DOCUMENTS

| 5,860,679 A | 1/1999 | Fukuda et al. |
| 6,508,971 B2 * | 1/2003 | Leyden ................. B29C 41/12 264/308 |

(Continued)

FOREIGN PATENT DOCUMENTS

| EP | 2 042 324 A2 | 4/2009 |
| WO | 2006/034012 A2 | 3/2006 |

OTHER PUBLICATIONS

Gibson et al.; Additive Manufacturing Technologies: Rapid Prototyping to Direct Digital Manufacturing; 2010; pp. 195-198 and p. 201; Springer Science + Business Media, LLC; 2010.

*Primary Examiner* — Atul P Khare
(74) *Attorney, Agent, or Firm* — Maginot Moore & Beck LLP

(57) ABSTRACT

A three-dimensional object printer ejects drops of a build material from a plurality of ejectors in a first printhead to form an object on a first region of a member and ejects drops of a support material from a plurality of ejectors in a second printhead to support the object on the first region of the member. The second printhead ejects drops of the support material onto a second region of the member that is separate from the first region to form a substrate layer. The first printhead ejects drops of the build material onto the substrate layer to form a printed test pattern. An image sensor generates image data of the printed test pattern to identify an inoperable ejector in the first printhead.

11 Claims, 6 Drawing Sheets

(56) References Cited

U.S. PATENT DOCUMENTS

| | | | |
|---|---|---|---|
| 6,660,209 B2 * | 12/2003 | Leyden | B29C 41/12 264/308 |
| 6,782,303 B1 * | 8/2004 | Fong | B29C 67/0059 700/118 |
| 6,989,115 B2 | 1/2006 | Russell et al. | |
| 7,077,638 B2 * | 7/2006 | Leyden | B29C 41/12 425/174.4 |
| 7,372,555 B2 | 5/2008 | Watanabe | |
| 7,706,910 B2 * | 4/2010 | Hull | B29C 67/0085 264/308 |
| 7,731,887 B2 * | 6/2010 | Hull | B33Y 10/00 264/308 |
| 7,747,341 B2 | 6/2010 | Dubois et al. | |
| 7,771,183 B2 * | 8/2010 | Hull | B29C 67/0077 264/113 |
| 8,033,811 B2 * | 10/2011 | Swanson | B29C 31/042 264/113 |
| 8,219,234 B2 * | 7/2012 | Kritchman | B29C 67/0055 700/118 |
| 8,506,038 B2 | 8/2013 | Mizes et al. | |
| 8,602,518 B2 | 12/2013 | Mizes et al. | |
| 8,781,615 B2 * | 7/2014 | Kritchman | B29C 67/0055 264/308 |
| 9,662,834 B2 * | 5/2017 | Shtilerman | B29C 67/0055 |
| 2002/0089561 A1 | 7/2002 | Weitzel et al. | |
| 2006/0061613 A1 * | 3/2006 | Fienup | B29C 67/0059 347/19 |
| 2006/0111807 A1 | 5/2006 | Gothait et al. | |
| 2009/0085952 A1 * | 4/2009 | Yamazaki | B41J 2/2142 347/19 |
| 2009/0167817 A1 | 7/2009 | Orr | |
| 2010/0303281 A1 | 12/2010 | Wu et al. | |
| 2011/0242187 A1 | 10/2011 | Mongeon et al. | |
| 2013/0316081 A1 | 11/2013 | Kovalcik et al. | |
| 2013/0328227 A1 * | 12/2013 | McKinnon | B29C 67/0088 264/40.1 |

\* cited by examiner

SYSTEM AND METHOD FOR TEST PATTERN FORMATION DURING THREE-DIMENSIONAL OBJECT PRINTING

TECHNICAL FIELD

This disclosure is directed to three-dimensional object printing systems and, more particularly, to systems and methods of forming test patterns during operation of three-dimensional object printing systems.

BACKGROUND

Three-dimensional printing, also known as Additive manufacturing, is a process of making a three-dimensional solid object from a digital model of virtually any shape. Many three-dimensional printing technologies use an additive process in which successive layers of the part are built on top of previously deposited layers. Some of these technologies use inkjet printing, where one or more printheads eject successive layers of material. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days to produce the object. One issue that arises in the production of three-dimensional objects with a three-dimensional printer is consistent functionality of the ejectors in the printheads that eject the drops of material that form the objects. During printing of an object, one or more ejectors can deteriorate by ejecting the material at an angle, rather than normal, to the printhead, ejecting drops that are smaller than an ejector should eject, or by failing to eject any drop at all. An ejector suffering from any of these operational deficiencies is known as an inoperative ejector. If the operational status of one or more ejectors deteriorates during the printing of the object, the quality of the printed object cannot be assessed until the printing operation is completed. Consequently, print jobs requiring many hours or multiple days can produce objects that do not conform to specifications due to inoperative ejectors in the printheads. Once such objects are detected, the printed objects are scrapped, restorative procedures are applied to the printheads to restore ejector functionality, and the print job is repeated. Consequently, improvements to three-dimensional object printers that enable identification of inoperable ejectors during a printing operation to enable correction of the inoperable ejectors without incurring a loss of partially printed objects would be beneficial.

SUMMARY

In one embodiment, a three-dimensional object printer that forms printed test patterns of a build material during a three-dimensional printing operation has been developed. The three-dimensional object printer includes a member configured to receive a build material and a support material during a three-dimensional object printing process, a first printhead including a first plurality of ejectors, the first plurality of ejectors being configured to eject drops of the build material toward the member, a support material dispenser configured to emit the support material onto the member, an image sensor configured to generate scanned image data of the build material and the support material formed on the member, and a controller operatively connected to the first printhead, the support material dispenser, and the image sensor. The controller is configured to operate the support material dispenser to form a first layer of the support material on a first region of the member, operate the first plurality of ejectors in the first printhead to eject a portion of a first predetermined pattern of drops of the build material onto the first layer of the support material to form a first portion of a first test pattern, operate the image sensor to generate scanned image data of the first portion of the first test pattern, operate the support material dispenser to form at least one additional layer of the support material on the first region of the member over the first layer of the support material and the first portion of the first test pattern, operate the first plurality of ejectors in the first printhead to eject a portion of a second predetermined pattern of drops of the build material onto the at least one additional layer to form a second portion of a first test pattern, operate the image sensor to generate scanned image data of the second portion of the test pattern, and identify at least one inoperable ejector in the first printhead with reference to the scanned image data of the first portion of the first test pattern and the scanned image data of the second portion of the first test pattern.

In another embodiment, a method of operating a three-dimensional object printer to form printed test patterns of a build material during a three-dimensional printing operation has been developed. The method includes operating with a controller a support material dispenser to form a first layer of the support material on a first region of a member, operating with the controller a first plurality of ejectors in a first printhead to eject a portion of a first predetermined pattern of drops of the build material onto the first layer of the support material to form a first portion of a first test pattern, operating with the controller an image sensor to generate scanned image data of the first portion of the first test pattern, operating with the controller the support material dispenser to form at least one additional layer of the support material on the first region of the member over the first layer of the support material, operating with the controller the first plurality of ejectors in the first printhead to eject a portion of a second predetermined pattern of drops of the build material onto the at least one additional layer to form a second portion of a first test pattern, operating with the controller the image sensor to generate scanned image data of the second portion of the test pattern, and identifying with the controller at least one inoperable ejector in the first printhead with reference to the scanned image data of the first portion of the first test pattern and the scanned image data of the second portion of the first test pattern.

In another embodiment, a method of operation a three-dimensional object printer has been developed. The method includes operating with a controller a first plurality of ejectors in a first printhead to form a first layer of a first build material on a first region of a member, operating with the controller a second plurality of ejectors in a second printhead to eject a portion of a first predetermined pattern formed from drops of a second build material onto the first layer of the first build material to form a first portion of a first test pattern, operating with the controller an image sensor to generate scanned image data of the first portion of the first test pattern, operating with the controller the first plurality of ejectors in the first printhead to form at least one additional layer of the first build material on the first region of the member over the first layer of the build material and the first portion of the first test pattern, operating with the controller the second plurality of ejectors in the second printhead to eject a portion of a second predetermined pattern of drops of the second build material onto the at least one additional layer of the first build material to form a second portion of the first test pattern, operating with the controller the image sensor to generate scanned image data of the second portion of the test pattern, and identifying with the controller at least one inoperable ejector in the first printhead with reference to the scanned image data of the first portion of the first test pattern and the scanned image data of the second portion of the first test pattern.

BRIEF DESCRIPTION OF THE DRAWINGS

The foregoing aspects and other features of an apparatus or printer that forms test patterns during three-dimensional object printing are explained in the following description, taken in connection with the accompanying drawings.

DETAILED DESCRIPTION

Figure 1:
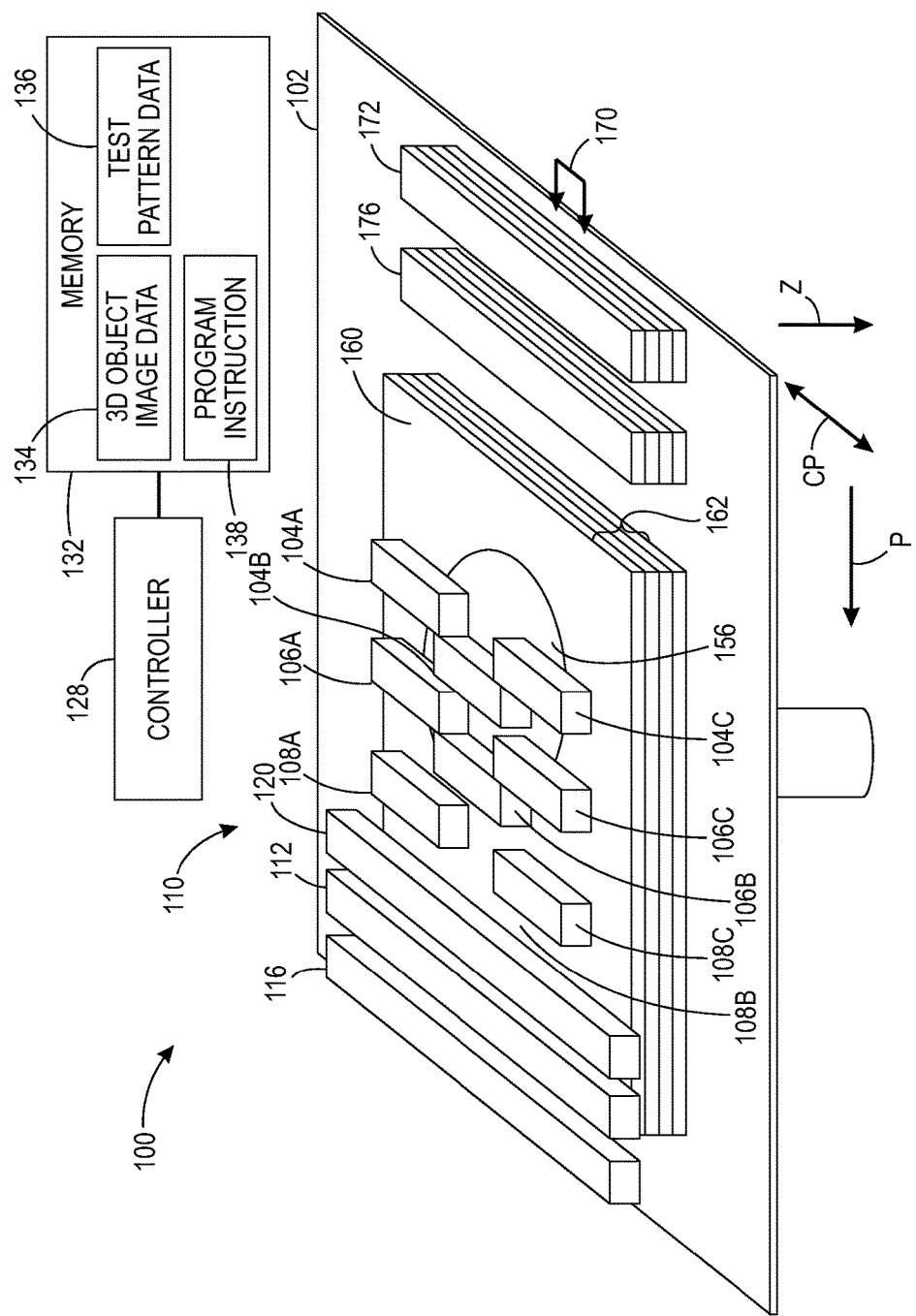
FIG. 1 is a diagram of a three-dimensional object printer.

For a general understanding of the environment for the device disclosed herein as well as the details for the device, reference is made to the drawings. In the drawings, like reference numerals designate like elements.

As used herein, the term "build material" refers to a material that is ejected in the form of liquid drops from a plurality of ejectors in one or more printheads to form layers of material in an object that is formed in a three-dimensional object printer. Examples of build materials include, but are not limited to, thermoplastics, UV curable polymers, and binders that can be liquefied for ejection as liquid drops from ejectors in one or more printheads and subsequently hardened into a solid material that forms an object through an additive three-dimensional object printing process. In some three-dimensional object printer embodiments, multiple forms of build material are used to produce an object. In some embodiments, different build materials with varying physical or chemical characteristics form a single object. In other embodiments, the printer is configured to eject drops of a single type of build material that incorporates different colors through dyes or other colorants that are included in the build material. The three-dimensional object printer controls the ejection of drops of build materials with different colors to form objects with varying colors and optionally with printed text, graphics, or other single and multi-color patterns on the surface of the object.

As used herein, the term "support material" refers to another material that is ejected from printheads during a three-dimensional object printing process to stabilize the object that is formed from the build materials. For example, as the three-dimensional object printer applies layers of the build material to form the object, at least one printhead in the printer also ejects layers of the support material that engage portions of the object. The support material holds one or more sections of the build material in place before the object constructed with the build material is a complete object and supported because it is a single object. A simple example of the use of support material includes the construction of a cane using the three-dimensional object printer. The arched part of the cane is at the top of the object, and the support material provides support for the downward pointing part of the handle prior to completion of the top of the arch in the cane. The support material also prevents newly formed features from breaking before sufficient build material is present to hold the object together, and prevents portions of the build material that have not fully solidified from flowing out of position before the hardening process is completed. Examples of support material include, but are not limited to, waxy materials that provide support to the object during the printing process and that can be easily removed from the object after the printing process is completed.

As used herein, the term "process direction" refers to a direction of movement of a support member past one or more printheads during a three-dimensional object formation process. The support member holds the three-dimensional object and accompanying support material and building material during the print process. In some embodiments, the support member is a planar member such as a metal plate, while in other embodiments the support member is a rotating cylindrical member or a member with another shape that supports the formation of an object during the three-dimensional object printing process. In some embodiments, the printheads remain stationary while the support member and object moves past the printhead. In other embodiments, the printheads move while the support member remains stationary. In still other embodiments, both the printheads and the support member move.

As used herein, the term "cross-process direction" refers to a direction that is perpendicular to the process direction and in the plane of the support member. The ejectors in two or more printheads are registered in the cross-process direction to enable an array of printheads to form printed patterns of build material and support material over a two-dimensional planar region. During a three-dimensional object printing process, successive layers of build material and support material that are formed from the registered printheads form a three-dimensional object.

As used herein, the term "z-direction" refers to a direction that is both perpendicular to the process direction and the cross process direction and is normal to the plane of the support member. At the beginning of the three-dimensional object printing process, a separation along the z-direction refers to a distance of separation between the support member and the printheads that form the layers of build material and support material. As the ejectors in the printheads form each layer of build material and support material, the printer adjusts the z-direction separation between the printheads and the uppermost layer to maintain a substantially constant distance between the printheads and the uppermost layer of the object during the printing operation. In many three-dimensional object printer embodiments, the z-direction separation between the printheads and the uppermost layer of printed material is maintained within comparatively narrow tolerances to enable consistent placement and control of the ejected drops of build material and support material. In some embodiments, the support member moves away from the printheads during the printing operation to maintain the z-direction separation, while in other embodiments the printheads move away from the partially printed object and support member to maintain the z-direction separation.

As used herein, the term "inoperable ejector" is used in reference to both a single printhead and to multiple printheads. When referring to a single printhead, the term "inoperable ejector" refers to an ejector that either partially or completely fails to eject drops of a build material or support material during a three-dimensional object printing operation. In some instances, the inoperable ejector is clogged and cannot eject drops or ejects drops only intermittently. In other instances, the ejector ejects drops that land on incorrect locations on the support member or other layers of build or support material. When referring to two or more printheads, the term "inoperable ejector" also refers to a registration error between the relative positions of two or more printheads. As used herein, the term "registration error" refers to an offset in the position of two or more printheads in the process direction or cross-process direction that deviates from a predetermined process direction or cross-process direction offset between the printheads when the printheads are properly registered. In one configuration, the corresponding ejectors in two different printheads eject drops of build material or support material in a single column that extends in the process direction with no difference (zero offset) in the cross-process direction locations of the drops when the printheads are properly registered. A registration error between the printheads produces a cross-process direction offset between the drops of material from each ejector in the first printhead with the corresponding ejector in the second printhead. In other configurations, printheads are offset from each other by a predetermined distance in the cross-process direction to cover different regions of an object receiving surface and a deviation from the predetermined offset produces a registration error. As described in more detail below, one or more printhead arrays each include multiple printheads positioned along the cross-process direction with a predetermined registration that enables the printheads to eject drops of the build material or support material onto predetermined locations to form layers of the object and support layers for the object. Inoperable ejectors generate registration errors due to the relative positions of two or more printheads produce errors in the structures that are formed in the three-dimensional printer.

As used herein, the term "dispenser" refers to one or more devices that emit support material in a three-dimensional object printer during a three-dimensional object printing process. In one embodiment, a dispenser includes one or more printheads that incorporate a plurality of ejectors. The ejectors emit drops of the support material onto predetermined locations of a series of two-dimensional layers that are formed from the support material and build material during a three-dimensional object printing process. In another embodiment, the dispenser is a spreader device that emits a uniform layer of a support material, such as a powdered resin or plaster material. In the spreader device embodiment, the build material is a binder that adheres portions of the powder together to form the three-dimensional object. Other portions of the powder that do not receive the binder material are removed from the three-dimensional object after completion of the printing process.

FIG. 1 depicts a three-dimensional object printer 100 that is configured to operate printheads to form printed test patterns during a three-dimensional object formation operation to enable missing ejector detection and printhead registration. The printer 100 includes a support member 102, first build material printhead array including printheads 104A-104C, second build material printhead array including printheads 106A-106C, an optional support material printhead array including printheads 108A-108B, an ultraviolet (UV) curing device 112, an image sensor 116, a leveler 120, and a controller 128. In the illustrative embodiment of FIG. 1, the three-dimensional object printer 100 is depicted during formation of a three-dimensional printed object 156 that is formed from a plurality of layers of the build material. The support material 160 surrounds the object 156 with a plurality of layers 162 to stabilize the object 156 during the three-dimensional object formation process.

In the embodiment of FIG. 1, the support member 102 is a planar member, such as a metal plate, that moves in a process direction P. The leveler 120, printhead arrays 104A-104C, 106A-106C, and 108A-108C, UV curing device 112, and image sensor 116 form a print zone 110 and the member 102 carries any previously formed layers of the support material and build material through the print zone 110 in the process direction P. During the printing operation, the support member 102 moves in a predetermined process direction path that passes the printheads multiple times to form successive layers of the build material 156, support material 160, and of the test pattern layers 172 and 176. In some embodiments, multiple members similar to the member 102 pass the print zone 110 in a carousel or similar configuration. One or more actuators move the member 102 through the print zone 110 in the process direction P. In the embodiment of FIG. 1, an actuator also moves the support member 102 in the direction Z away from the components in the print zone 110 after each layer of build and support material is applied to the support member. The actuator moves the support member 102 in the Z direction to maintain a uniform separation between the uppermost layer of the object 156 and the components in the print zone 110. The print zone 110 forms an additional layer to the three-dimensional printed object or objects on each member during each circuit through the path to form multiple sets of three-dimensional objects in parallel.

In the configuration of FIG. 1, the printhead arrays including the printheads 104A-104C and 106A-106C are configured to eject drops of the build material toward the support member 102 to form layers of a three-dimensional printed object, such as the object 156. Each of the printheads 104A-104C and 106A-106C includes a plurality of ejectors that are receive the build material in a liquefied form and eject liquid drops of the build material. In one embodiment, each ejector includes a fluid pressure chamber that receives the liquid build material, an actuator such as a piezoelectric actuator, and an outlet nozzle. The piezoelectric actuator deforms in response to an electric firing signal and urges the liquefied build material through the nozzle as a drop that is ejected toward the member 102. If the member 102 bears previously formed layers of a three-dimensional object, then the ejected drops of the build material form an additional layer of the object. Each of the printheads 104A-104C and 106A-106A includes a two-dimensional array of the ejectors, with an exemplary printhead embodiment including 880 ejectors. During operation, the controller 128 controls the generation of the electrical firing signals to operate selected ejectors at different times to form each layer of the build material for the object 156. As described in more detail below, the controller 128 also generates firing signals for the ejectors in the printheads 104A-104C and 106A-106C to print test patterns of the build material that are used to identify inoperable ejectors.

During operation, one or more of the ejectors in the printheads 104A-104C and 106A-106C becomes a missing ejector if the ejector is clogged or otherwise fails to eject drops of a build material in a reliable manner. In some situations, a missing ejector ejects drops only intermittently or onto an incorrect location of the member 102 or the upper layer of the object 156. A missing ejector is one type of inoperable ejector. As described below, the controller 128 identifies missing ejectors with reference to scanned image data of test patterns where missing ejectors fail to form printed marks in predetermined locations in the test pattern. When missing ejectors are identified, the printer 100 can halt the printing process until the missing ejectors return to an operable condition through a cleaning or purging process or the printer 100 operates neighboring ejectors around a missing ejector to compensate for the missing ejector while the printing operation continues.

As depicted in FIG. 1, two printhead arrays 104A-104C and 106A-106C eject drops of a build material to form the object 156. The printhead array 104A-104C includes three printheads that are staggered in the cross-process direction CP in the print zone 110 to enable the ejectors in the printheads 104A-104C to form printed patterns across the width of the object 156. The printheads 106A-106C are arranged in a similar manner. While not expressly illustrated in FIG. 1, each of the printhead arrays 104A-104C and 106A-106C includes at least one actuator, such as a stepper motor, that moves the printheads along the cross-process direction axis CP. The controller 128 is operatively connected to the actuators and optionally activates the actuators to adjust the cross-process direction locations of the printheads 104A-104C and 106A-106C.

In one configuration, the printheads 104A-104C and 106A-106C ejects drops of a build material with two different colors or the printhead arrays eject different forms of build material that are combined to form a single object. While FIG. 1 depicts two printhead arrays 104A-104C and 106A-106C that eject two build material colors; alternative configurations include additional printhead arrays that eject different build material colors or different types of build material. Each of the ejectors in the printhead 104A is registered in the cross-process direction CP with respect to a corresponding ejector in the printhead 106A. That is to say, each ejector in the printhead 104A ejects drops of the build material onto the same location along the cross-process direction axis CP as the corresponding ejector in the printhead 106A when the printheads are registered. The printheads 104B and 104C are registered with the printheads 106B and 106C, respectively, in the same manner. In another configuration, the printhead arrays are registered with a cross-process direction offset that corresponds to approximately one-half of the width of the build material drops that are formed on the object 156. The cross-process direction offset effectively doubles the resolution of the printhead arrays during printing operations. For example, if the printhead array 104A-104C ejects drops of the build material at 300 drops per inch (DPI) along the cross-process direction axis CP, then the combination of the printheads 104A-104C and 106A-106C ejects drops of the build material at 600 DPI.

During operation of the printer 100, the printheads may move out of ideal registration for various reasons including, but not limited to, thermal expansion and vibration. The printheads 104A-104C and 106A-106C eject drops of the build material to form test patterns that enable identification of registration errors. As described above, registration errors between printheads are one source of inoperable ejectors since the misregistration results in drops of the build material being placed in incorrect locations during the three-dimensional object printing process. The controller 128 operates one or more of the printhead array actuators to adjust the cross-process locations of the printheads 104A-104C and 106A-106C to correct for the registration errors.

In the printer 100, the printhead array 108A-108C includes printheads that eject drops of the support material during a printing operation. In the embodiment of the printer 100, the printheads 108A-108C each include an array of ejectors and eject drops of the support material in the same manner as the ejectors in the printheads 104A-104C and 106A-106C eject drops of the build material.

While FIG. 1 depicts two printhead arrays that eject drops of the build material, alternative embodiments can include three or more printhead arrays that form printed objects with additional build materials. Another embodiment includes only a single printhead array. While the printhead arrays 104A-104C, 106A-106C, and 108A-108C are each depicted as including three printheads, alternative configurations can include few printheads or a greater number of printheads to accommodate print zones with different sizes in the cross-process direction. Additionally, in rasterized three-dimensional object printer embodiments, one or more printheads move along the cross-process direction axis CP during printing operations.

In the printer 100, the UV curing device 112 is an ultraviolet light source that produces UV light across the print zone 110 in the cross-process direction CP. The UV light from the UV curing device 112 hardens the build material that is formed on the uppermost layer of the object 156 to form a durable portion of the object 156. The UV curing process solidifies the build material and in some embodiments, the surrounding support material 160 prevents the build material from flowing out of position before the curing process solidifies the build material.

The image sensor 116 is, for example, an array of photodetectors that is arranged across the print zone 110 in the cross-process direction CP is configured to generate digitized image data that corresponds to light reflected from the build material and support material that is formed on the member 102. In one embodiment, the photodetectors generate gray scale 8-bit image data with a total of 256 (0 to 255) levels that correspond to a level of reflected light that each photodetector receiver from the top-most layer of printed support material and printed build material. In other embodiments, the image sensor 116 incorporates multispectral photodetector elements such as red, green, blue (RGB) sensor elements. During operation, the image sensor 116 generates multiple image scanlines that correspond to segments of the top surface of the printed support material and build material. As the support member 102 moves past the image sensor 116, the image sensor 116 generates two-dimensional scanned image data from a series of the scanlines. In particular, the image sensor 116 generates scanned image data from the top layers of the substrate and test patterns that are formed on the support material substrate 172 and build material substrate 176 of FIG. 1. The controller 128 receives the scanned image data and performs further processing of the scanned image data that include printed test patterns to identify inoperable ejectors.

The leveler 120 is a member that is configured to engage the uppermost surface of each layer of the build material and support material before the UV curing device 112 cures the build material. The leveler, which is also referred to as a planarizer, applies the abrasive surface to the object 156 to smooth the upper most layer of the object 156 to maintain a uniform surface that receives an additional layer of the build material. While the other components in the print zone 110 remain at a predetermined distance in the Z direction from the object 156, the leveler 120 is configured to engage the object 156 to smooth the uppermost layer.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators that control the movement of the support member 102, the printhead arrays including the printheads 104A-104C, 106A-106C, and 108A-108C, the UV curing device 112 and the image sensor 116. The controller 128 is operatively connected to a memory 132. In the embodiment of the printer 100, the memory 132 includes volatile data storage devices such as random access memory (RAM) devices and non-volatile data storage devices such as solid-state data storage devices, magnetic disks, optical disks, or any other suitable data storage devices. The memory 132 stores 3D object image data 134, test pattern data 138, and stored program instructions 138. The controller 128 executes the stored program instructions 138 to operate the components in the printer 100 to both form the three-dimensional printed object 156 and print test patterns that identify inoperable ejectors in the printheads. The 3D object image data 134 includes, for example, a plurality of two-dimensional image data patterns that correspond to each layer of build material and support material that the printer 100 forms during the three-dimensional object printing process. The controller 128 ejects drops of the build material from the printheads 104A-104C and 106A-106C with reference to each set of two-dimensional image data to form each layer of the object 156 while the printheads 108A-108C eject drops of the support material to form the support material region 160. The memory 132 also stores test pattern data 136 that correspond to predetermined patterns of marks that the ejectors in the printheads form on a region of the support member 102 that is separate from the object 156 to identify inoperable ejectors in the printheads.

During operation, the controller 128 operates the ejectors in the printheads 104A-104C and 106A-106C to eject drops of the build material onto the support member 102. The controller 128 also operates the ejectors in the printheads 108A-108C to eject drops of the support material onto the support member 102 around the regions of the build material to support the build material that forms a three-dimensional printed object. The support member 102 passes the print zone 110 multiple times to form the object 156 from multiple layers of the build material that are supported by the multiple layers 162 of the support material 160. During the printing operation, the controller 128 also operates the support material printheads 108A-108C to eject drops of the support material onto another region of the support member 102 that is separate from the region where the object 156 is formed. The support material forms a substrate layer 172 that subsequently receives a portion of a predetermined test pattern from one or more of the printheads 104A-104C and 106A-106C. The build material and the support material are optically dissimilar from each other to enable the image sensor 116 to generate image data where the marks formed by the build material are distinguishable from the support material layer. The image sensor 116 generates scanned image data of the substrate layer and the printed marks in the test pattern.

In one embodiment, only a portion of the test pattern is formed on a single layer of the support material. During subsequent passes of the support member 102, the support material printheads 108A-108C eject drops of the support material to form at least one layer that covers the previously printed test pattern until the previously printed marks are no longer visible to the image sensor 116. The controller 128 then operates the printheads 104A-104C and 106A-106C to generate another portion of the test pattern and the image sensor 116 generates additional scanned image data of the next portion. After generating the full test pattern from two or more sets of scanned image data, the controller 128 identifies inoperable ejectors based on missing ejectors or printheads that generate registration errors in the printed test pattern.

In the embodiment of FIG. 1, the printer 100 also identifies inoperable ejectors in the support material printheads 108A-108C. The controller 128 operates one or more of the build material printheads 104A-104C and 106A-106C to form layers of the build material 176 on the substrate 102 in a third region that is separate from both the object 156 and the layers of the support material 172 where the first test pattern is formed. The controller 128 operates the ejectors in the printheads 108A-108C to form a portion of another test pattern on the substrate layer 176. The image sensor 116 generates second scanned image data of the portion of the test pattern that is formed from the support material over the layer of the build material. The controller 128 operates the printheads one or more of 104A-104C and 106A-106C to form additional layers of the build material over the second layer 176 and ejects additional portions of the support material in the test pattern from the ejectors in the printheads 108A-108C.

An alternative embodiment of the printer 100 in FIG. 1 either omits the support material printhead array 108A-108C or supplies a build material to the printheads 108A-108C instead of the support material. In either configuration, the alternative embodiment of the printer 100 forms three-dimensional printed objects without a support material. The support material printheads can be omitted when the build materials do not require additional support material to form the three-dimensional printed objects and for printers that form three-dimensional printed objects with shapes that do not require additional support material.

Figure 2:
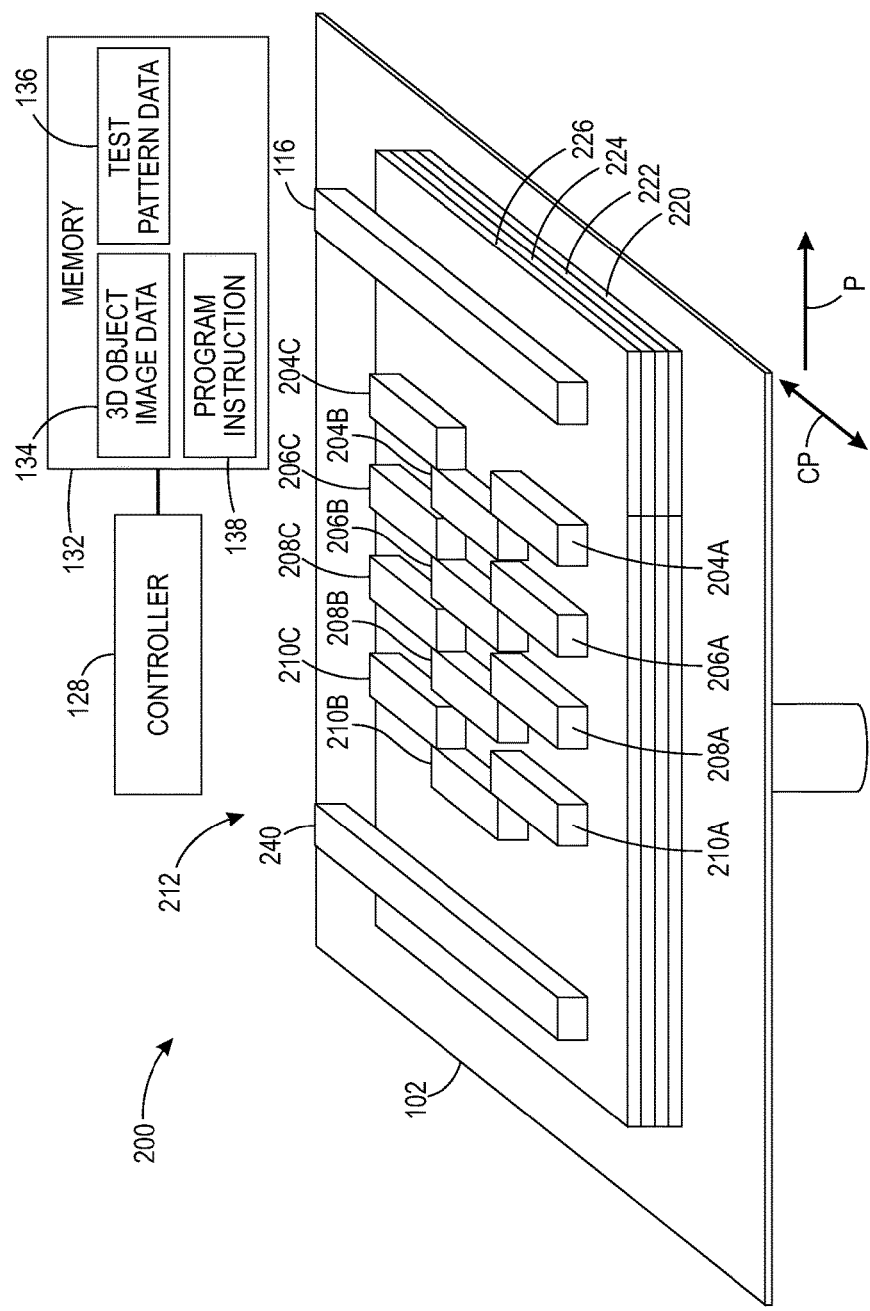
FIG. 2 is a diagram of another three-dimensional object printer.

FIG. 2 depicts another embodiment of a three-dimensional object printer 200 that is configured to operate printheads to form printed test patterns during a three-dimensional object formation operation to enable missing ejector detection and printhead registration. The printer 200 includes a support member 102, image sensor 116, controller 128, and memory 132 that are similar to the corresponding components in the printer 100 of FIG. 1. In the printer 200, the support material dispenser is embodied as a support material spreader 240. The printer 200 includes four printhead arrays for optically transparent binder (printheads 204A-204C), yellow binder (printheads 206A-206C), magenta binder (printheads 208A-208C), and cyan binder (printheads 210A-210C). The support material spreader 240, printhead arrays, and the image sensor 116 form a print zone 212 in the printer 200. In the embodiment of the printer 200, the spreader 240 dispenses a uniform layer of a first support material powder that produces visually perceptible colors when combined with the binders from the printheads in the print zone 212.

In FIG. 2, the spreader 240 dispenses layers of the support material as depicted by the layers 220, 222, 224, and 226, in a region of the support member 102 that receives the printed test patterns of binder drops from the printheads 206A-206C, 208A-208C, and 210A-210C. The spreader 240 forms one layer of the support material, such as the layer 220, and the controller 128 operates ejectors in the printheads to form a portion of the test pattern on the layer of the support material. The optical sensor 116 then generates scanned image data of the portion of the printed test pattern. During operation, the spreader 240 forms at least one additional layer of the support material over portions of the printed test pattern before the printheads 206A-206C, 208A-208C, and 210A-210C form another portion of the printed test pattern. For example, in FIG. 2 the spreader 240 forms two layers of the support material 222 and 224 over the support material layer 220 prior to operation of the printheads to form another portion of the printed test pattern on the layer 224. In alternative configurations, only one intermediate layer of the support material separates each portion of the test pattern or three or more layers of the support material separate portions of the test pattern. The printer 200 forms one or more intermediate layers of the support material to ensure that the scanned image data of each portion of the test pattern does not include artifacts from previously printed portions of the test pattern. During operation, the printer 200 continues to form additional layers of the support material both to support the formation of the three-dimensional object and to provide an image receiving surface for printed drops of the binder material in the printed test pattern.

In the printer 200, the build material is a liquid binder that is ejected from the ejectors in the printheads in the print zone 212. Different compositions of binders react with the powder layer of the support material to solidify and harden with different visible colors. Different combinations of the cyan/magenta/yellow binders can produce printed patterns and a wide range of colors on the surface of the three-dimensional printed object. The portions of the print zone 212 that receive the printed test patterns include printed marks formed by the printhead 206A-206C, 208A-208C, and 210A-210C that are included in the image data generated by the image sensor 116. At the conclusion of the printing process, portions of the support material powder that do not solidify with the binder are removed and the solidified portions form the three-dimensional printed object.

The optically transparent binder printheads 204A-204C also eject drops of the binder onto the layers of the support material. In some embodiments, the optically transparent binder causes a restructuring of the particles of the support material, which changes the optical reflection from the front surface. The optical sensor 116 generates image data that includes regions containing the optically transparent binder with reflectance levels that are distinguishable from regions that do not receive the optically transparent binder material. In other embodiments, another set of printheads in the printer eject a color binder ejected in the same layer as the optically transparent binder. The presence of the optically transparent binder modifies the flow of the color binder in regions where it is present. The combination of the optically transparent binder and the colored binder produces an optical reflectance change, and the controller 128 identifies the location of the corresponding ejectors that ejects the optically transparent binder in the scanned image data.

Figure 3:
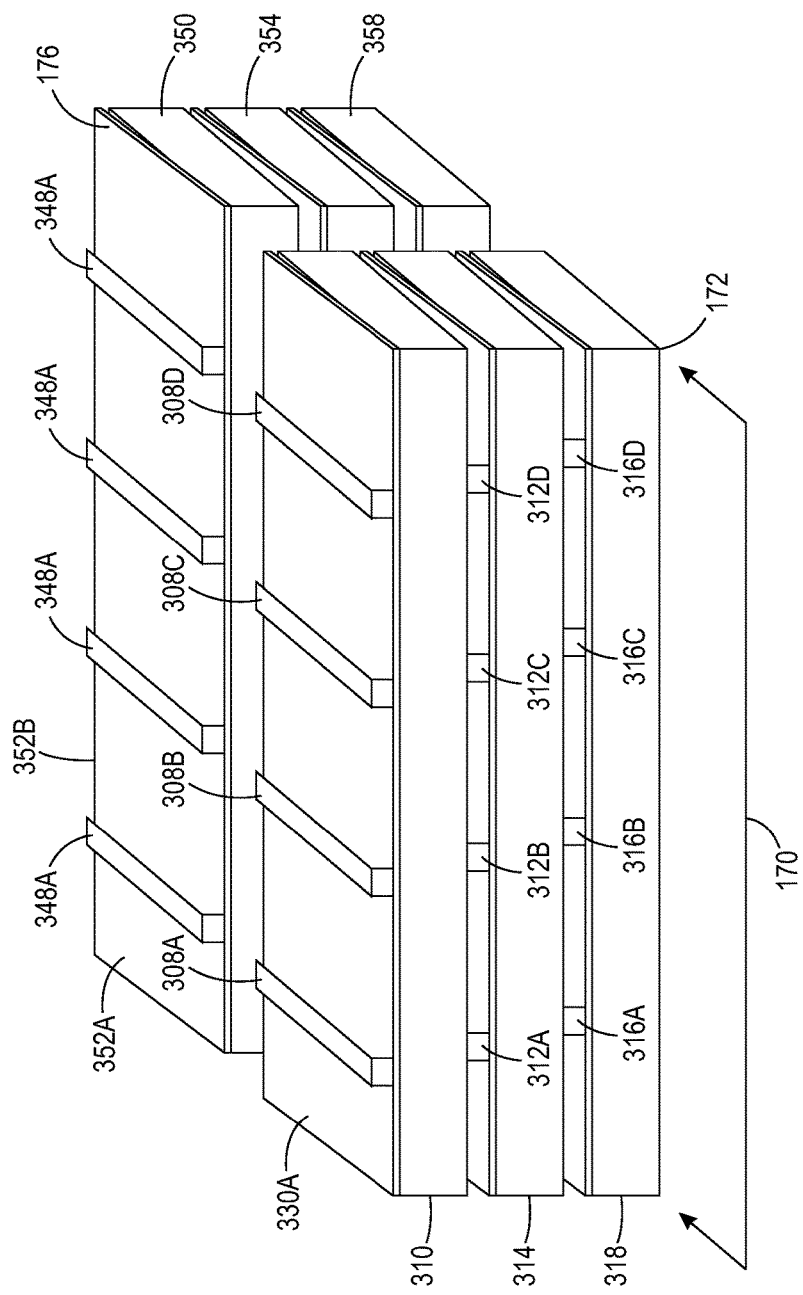
FIG. 3 is a view of a first stack of support materials and printed test patterns of build materials and a second stack of build materials and printed patterns of support materials from FIG. 1.

During operation, the controller 128 operates the printheads in the print zone 212 to form a three-dimensional printed object. The controller 128 also operates the spreader 240 to form layers of the support material and operates the printheads in the print zone 212 to form portions of a test pattern on at least some layers of the support material. In the printer 200, only a portion of the test pattern is formed on each layer of the support material. The spreader 240 produces additional layers of the support material during the printing process and the controller 128 operates selected ejectors in the printheads 206A-206C, 208A-208C, and 210A-210C to form a portion of the predetermined test pattern on different layers of the second substrate material. The image sensor 116 generates scanned image data of each portion of the printed test pattern, and the controller 128 identifies inoperable ejectors in the printheads in the print zone 212 with reference to the scanned image data As described above, the three-dimensional object printers 100 and 200 form printed test patterns over multiple layers of the support material as part of a process to identify and correct inoperable ejectors in the printheads. FIG. 3 depicts a view taken along line 170 of the substrate layers and marks in printed test patterns in the stacks 172 and 176 of FIG. 1. The stack 172 includes multiple layers of the support material including layers 310, 314, and 318. The controller 128 operates the ejectors in the printheads 104A-104C and 106A-106C to form printed marks on the surface of some of the support material layers, including the printed marks 308A-308D on the substrate layer 310, the printed marks 312A-312D on the substrate layer 314, and the printed marks 316A-316D on the substrate layer 318. In one embodiment, the printed marks are dashes that are formed from a predetermined number of drops of the build material (e.g. 10 drops) that extend in the process direction while the controller 128 selects ejectors that are staggered at predetermined intervals in the cross-process direction to form rows of dashes in the test pattern. The intermediate substrate layers, such as the layers 310 and 314, block previously printed portions of the test pattern from view of the image sensor 116 so only the marks in the top-most layer, such as the marks 308A-308D in FIG. 3, are exposed to the image sensor 116. In one embodiment of the printer 100, the printed marks of the build material have a thickness that can produce raised ridges in subsequent layers of the stack 172. The controller 128 operates ejectors in the support material printheads 108A-108C to fill the gaps between the printed marks in the test pattern after the image sensor 116 generates scanned image data of the marks. For example, in FIG. 3, the regions 330A and 330B around the printed marks 308A and 308B are filled with support material before another layer of the support material covers the printed marks. In other embodiments, the printer deposits the support material and the build material simultaneously and the optical contrast between the build and support materials enables the controller 128 to identify the build material dashes in scanned image data.

In FIG. 3, the second stack 176 is formed in a similar manner to the stack 172, but the controller 128 forms the substrate layers from the build material and forms the marks in the printed test pattern using the ejectors in the support material printheads 108A-108C. FIG. 3 depicts the layers of the build material 350, 354, and 358 with the top-most support material marks 348A-348D that form a portion of the test pattern for the support material printheads 108A-108D. The controller 128 also fills in the gaps between the support material marks with the build material to prevent the formation of ridges as depicted by the build material in regions 352A and 352B around the printed support material marks 348A and 348B. In other embodiments, the materials are deposited simultaneously.

In the embodiment of the printer 200, the test patterns are formed in a similar manner to the stack 172 with the test pattern being formed on multiple layers of the support material absent of any binder material in an alternating stack with layers of the support material that receive printed marks of the binder material. Since the printer 200 uses a spreader to distribute the support material, the only test patterns formed correspond to the printheads that eject the build material in the print zone 212. The image sensor 116 generates scanned image data for each portion of the printed test pattern.

Figure 4:
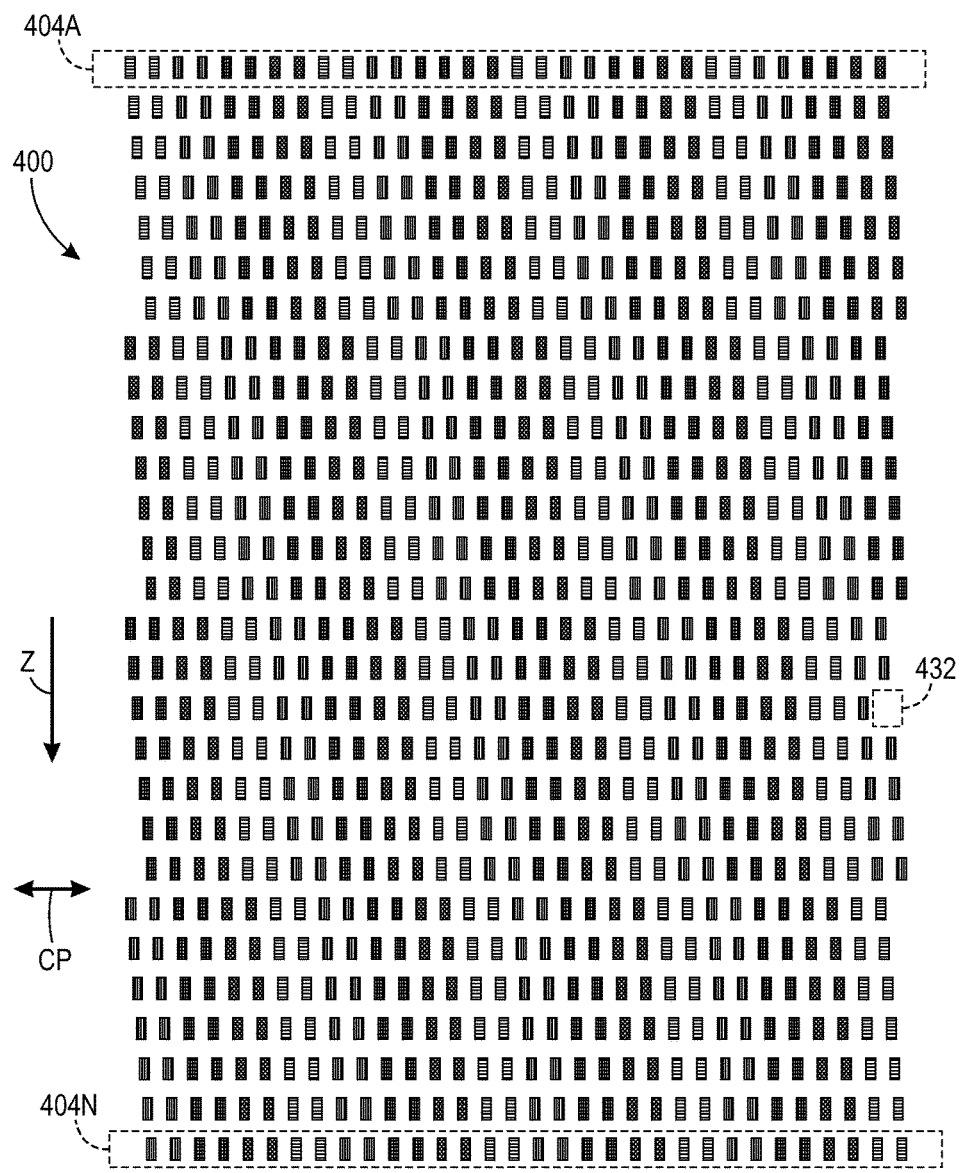
FIG. 4 is an illustrative depiction of a test pattern including a predetermined pattern of marks that are formed by ejectors in a plurality of printheads.

FIG. 4 depicts an example of a test pattern 400 that is rearranged into a two-dimensional layout. The test pattern 400 includes multiple rows of printed marks. A single ejector in one of the printheads forms each of the different marks in the test pattern 400. In FIG. 4, the test pattern 400 includes marks that are formed by cyan, yellow, magenta, and optically clear build materials, but alternative test patterns include a similar arrangement of printed marks for a different number of build material colors and for the support material test pattern in the printer 100. The test pattern 400 is formed with a plurality of rows of the marks, including rows 404A-404N in FIG. 4, where each row includes a plurality of marks offset from one another in the cross-process direction. Within each row, the marks extend in the process direction P. In the embodiment of FIG. 1 and FIG. 2, the test pattern is printed with a single row of the test pattern marks being printed on the corresponding support material or build material substrate. Thus, in FIG. 4 the arrangement of multiple rows in the test pattern 400 extends along the Z-axis as the printer forms individual rows of the printed marks on different substrate layers. In alternative configurations, the printer forms a larger portion of the test pattern on each substrate layer. Printing a larger portion of each test pattern on a single layer reduces the number of layers that are required to form a full test pattern, but also increases the size of the region on the support member used to print the test patterns instead of for printing an object.

In the printers 100 and 200, the controller 128 analyzes the image data that form the test pattern, such as the test pattern 400, to identify inoperable ejectors due to both missing ejectors and printhead registration errors. As depicted in FIG. 4, the box 432 around a blank region of image data depicts a missing mark that is formed by a missing ejector in a printhead. The controller 128 identifies missing marks that correspond to inoperable ejectors and can optionally halt the printing process, perform missing ejector compensation techniques that are known to the art, or attempt to clean or purge the missing ejector to restore operation. For printhead registration, the controller 128 performs filtering and convolutions with edge or center detection kernels of the image data corresponding to entire rows of the printed marks that are formed by ejectors in different printheads to identify the position of the dashes in the process direction and in the cross process direction. The cross-process offset between different ejectors in the different printheads measured across multiple rows of the scanned image data to identify if two or more printheads are misaligned. The misalignment manifests as inconsistent spacing in the cross-process direction between marks that correspond to ejectors in different printheads instead of identifying a predetermined cross-process direction separation between the marks that correspond to the predetermined test pattern. The controller 128 optionally halts operation of the printing process to alert operators to the printhead misregistration or operates one or more of the printhead array actuators to return the printheads to proper registration.

Figure 5:
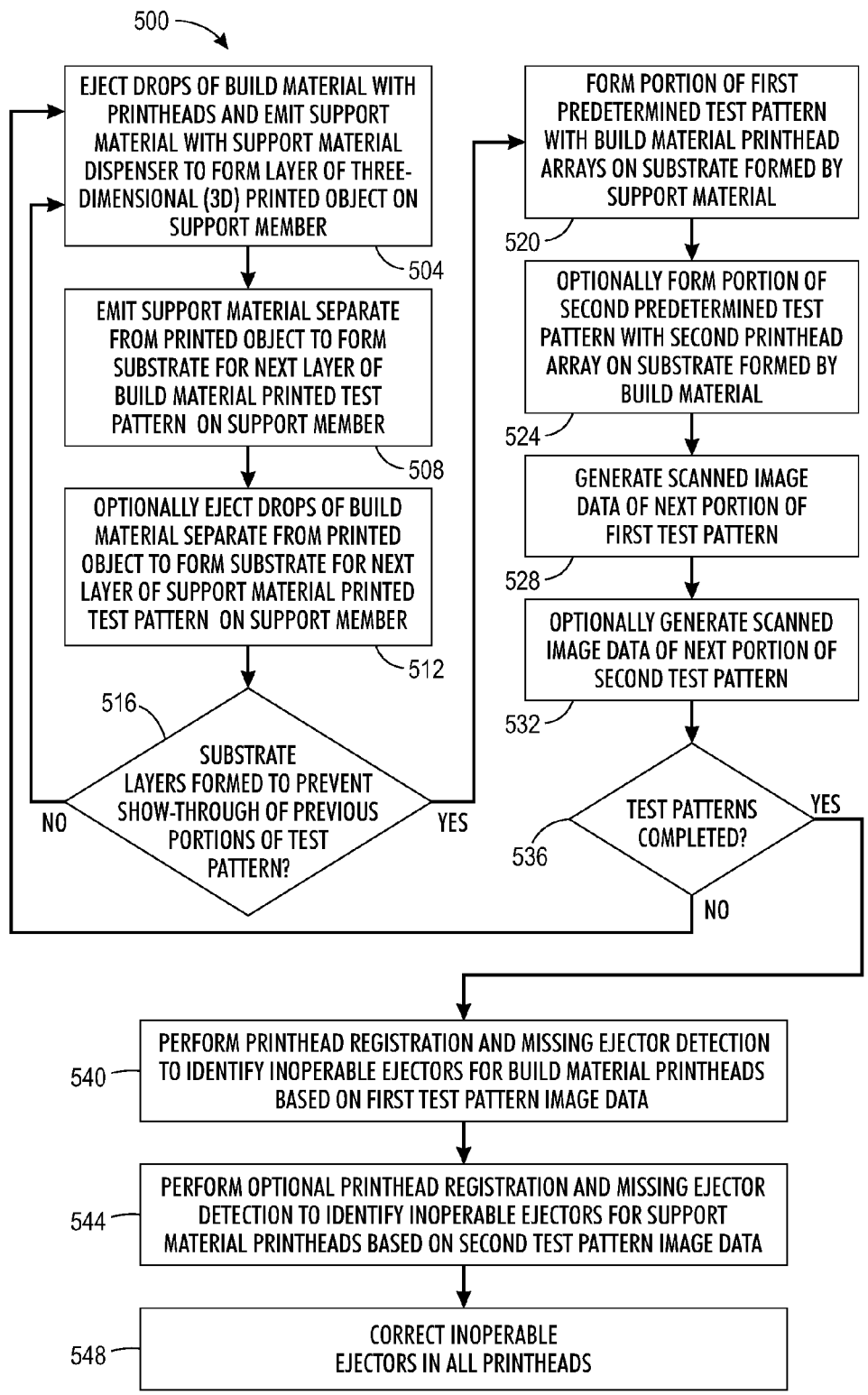
FIG. 5 is a block diagram of a process for operating a three-dimensional object printer to form test patterns and identify inoperable ejectors in printheads while the printheads perform a three-dimensional printing operation.

FIG. 5 depicts a process 500 for forming test patterns and performing inoperable ejector detection in a three-dimensional object printer. The process 500 is described in conjunction with the printer 100 of FIG. 1 and the printer 200 of FIG. 2 for illustrative purposes. In the discussion below, a reference to the process 500 performing an action or function refers to the operation of a controller, such as the controller 128, to execute stored program instructions to perform the task or function in conjunction with one or more components in a three-dimensional object printer.

Process 500 begins as the printer ejects drops of a build material with one or more printheads and emits support material with the support material dispenser to form a three-dimensional printed object on a surface of a support member (block 504). In the printer 100, the printheads 104A-104C and 106A-106C eject drops of the build material onto a first region of the support member 102 and the printheads 108A-108C eject the support material onto the first region to engage and support the build material. In the printer 200, the spreader 240 emits the support material on a layer that covers a first region of the support member 102. The ejectors in the printheads 204A-204C, 206A-206C, 208A-208C, and 210A-210C eject drops of the binder with different colors onto selected portions of the powder support material layer to form one layer of the three-dimensional printed object.

Process 500 continues as the printer emits support material onto a region of the support member that is separate from the region that contains the three-dimensional printed object (block 508). In the embodiment of the printer 100, the printheads 108A-108C eject drops of the support material to form a substrate layer of the support material as depicted by the stack 172 in FIG. 1. In the printer 200, the spreader 240 forms a layer of the support material, such as the layer 220, that receives a portion of the printed test pattern from the printheads 204A-204C, 206A-206C, 208A-208C, and 210A-210C. Process 500 continues as the printheads that eject the build material optionally form a layer of the build material on another region of the support that is separate from the region where the three-dimensional printed object is formed and from the region where the support material substrate layer is formed (block 512). In the printer 100, some or all of the printheads 104A-104C and 106A-106C form the layers that are depicted in the stack 176. In the embodiment of FIG. 2, the printer 200 does not perform the processing that is described in regards to block 508 because the printer 200 does not use printheads and ejectors to emit the support material.

During the process 500, the processing of blocks 504-512 continues as additional substrate layers are formed if a previously formed portion of the test pattern would still "show-through" from any previously formed portions of the test pattern (block 516). The term show-through refers to a situation where a previously formed portion of the test pattern remains at least partially visible to the image sensor 116 through one or more intermediate layers of the support material or build material. As described above, in the embodiment of the printer 100, the additional layer of support material in the stack 172 also fills in gaps between the marks that are formed in a portion of the test pattern and the additional layer of the build material in the stack 176 fills gaps between the marks of the support material.

After at least one intermediate layer of the support material or build material has been formed that provides a suitable surface to receive the test pattern (block 516), process 500 continues as the printhead arrays that eject build material form a portion of a predetermined test pattern on another region of the support member over the substrate layer of support material (block 520). In the printer 100, the controller 128 generates firing signals for selected ejectors in the printheads 104A-104C and 106A-106C to eject drops of the build material to form the test pattern marks on a top-most layer of the support material stack 172. The printer 200 generates firing signals for the selected ejectors in the printheads in the print zone 212 to eject drops of the binder onto a layer of the support material, such as the layers 220 or 224 before those layers are covered with additional support material. As described above with reference to FIG. 4, in some embodiments the printers 100 and 200 form a single row or set of contiguous rows from the larger test pattern during to form a portion of a first test pattern corresponding to the printheads that eject drops of the build material.

During process 500, the printer 100 also optionally ejects drops of the support material from the printheads 108A-108C onto the top most layer of the build material in the stack 176 to form a portion of a second test pattern for the ejectors in the support material printheads 108A-108C (block 524). The second test pattern of the support material is similar to the first test pattern of the build material and includes a plurality of rows of the printed marks. The controller 128 generates electrical firing signals for selected ejectors in the printheads 108A-108C to form one or more of the rows in a portion of the second test pattern on the top most layer of build material on the stack 176.

Process 500 continues as the image sensor 116 generates scanned image data of the next portion of the first test pattern that has been formed from the build material (block 528) and optionally generates additional scanned image data of the next portion of the second test pattern that has been formed from the support material in the embodiment of the printer 100 (block 532). In the printer 100, the image sensor 116 generates first scanned image data of the printed pattern of build material on the stack 172 and second image data of the printed pattern of support material that is printed on the stack 176. In the printer 200, the image sensor 116 generates image data of the pattern of build material that is formed on the top most layer of the support material.

Process 500 continues with the processing described above in regards to blocks 504-532 until the printer has formed a complete set of test patterns and generated two or more sets of image data for the entire test pattern (block 536). Once the printer has formed the complete test pattern and generated sets of image data for each portion of the test pattern (block 536), the process 500 continues as the controller 128 identifies inoperable ejectors from the printheads that eject the build material in the image data of the first test pattern (block 540). As described above, the controller 128 processes the image data of the test pattern to identify missing ejectors that fail to produce printed marks in the correct location within the test pattern and registration errors between two or more of the printheads that eject the build material. In the embodiment of the printer 100, the controller 128 also optionally identifies inoperable ejectors in the printheads 108A-108C that eject the support material with reference to the image data of the second test pattern (block 544). As with the printheads that eject the build material, the controller 128 identifies inoperable ejectors that are either missing ejectors or are inoperable due to registration errors between the printheads in the support material printhead array.

Process 500 continues as the controller 128 in the printer 100 or the printer 200 performs a corrective action in response to identification of one or more inoperable ejectors (block 548). As described above, in some printer embodiments the printer halts the printing process and generates an alert for an operator to correct issues with missing ejectors or printhead registration errors. In other embodiments, the printer performs correction actions and continues with the printing process. For example, when a missing ejector is identified, the controller 128 performs a printhead purging or cleaning process to return the missing ejector to normal operation. If two or more printheads experience registration errors during the printing operation, the controller 128 operates actuators in the printhead arrays to return the printheads to proper registration.

Figure 6:
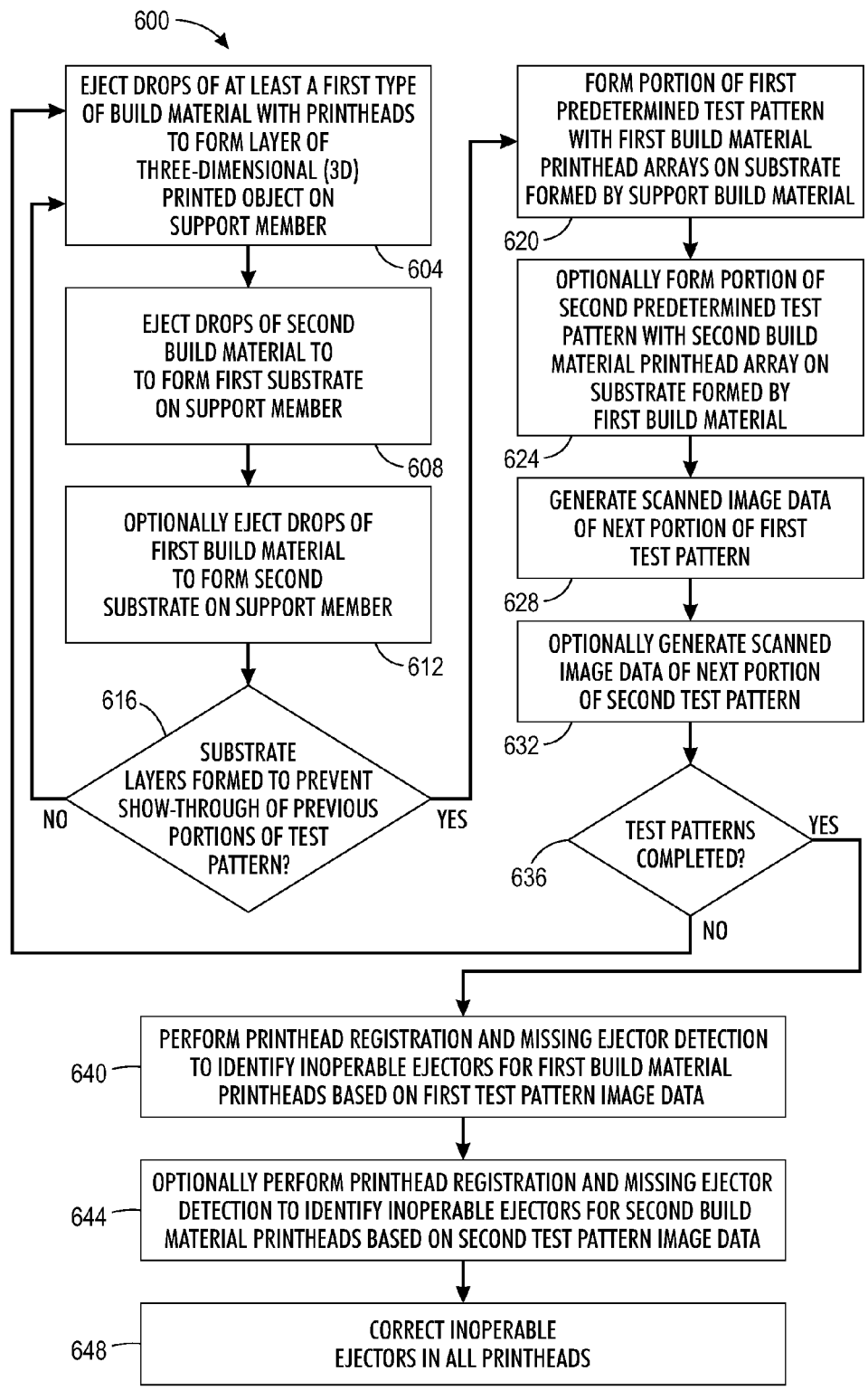
FIG. 6 is a block diagram of another process for operating a three-dimensional object printer to form test patterns and identify inoperable ejectors in printheads while the printheads perform a three-dimensional printing operation.

FIG. 6 depicts a process 600 for forming test patterns and performing inoperable ejector detection in a three-dimensional object printer using layers of build material without requiring the use of a support material. The process 600 is described in conjunction with the printer 100 of FIG. 1 in a configuration that does not use a support material for illustrative purposes. In the discussion below, a reference to the process 600 performing an action or function refers to the operation of a controller, such as the controller 128, to execute stored program instructions to perform the task or function in conjunction with one or more components in a three-dimensional object printer.

Process 600 begins as the printer 100 ejects drops of at least a first type of build material to form a layer of a three-dimensional printed object on the support member (block 604). In the example of FIG. 1, the printhead arrays 104A-104C eject a first type of the build material to form a layer of the object 156. The printer 100 optionally ejects a second type of build material using the printheads 106A-106C to form the object 156. In alternative embodiments, the three-dimensional object printer uses three or more types of build material to form the object 156. During process 600, the printer 100 does not eject a support material, and the printer 100 does not form layers of support material 162 that are present in FIG. 1.

For purposes of the process 600, at least two of the different types of build material are optically distinct. That is to say, when the printer 100 forms a substrate layer from a second type of build material, a printed pattern of a first type of build material formed on the substrate layer is distinguishable from the substrate material in scanned image data of the substrate and printed pattern, and vice-versa. For example, two different build materials that contain two different colorants but otherwise have substantially the same chemical and physical characteristics are optically distinct. In another embodiment, the two build materials have different chemical and physical characteristics and different colors that are optically distinct in the scanned image data. In still another embodiment, two build materials have different chemical and physical characteristics while having similar colors. If the reflectance level of the first type of build material differs from the second type of build material by a sufficient margin to be detectable in scanned image data, then the two types of build material are optically distinct.

Process 600 continues as the printer 100 ejects drops of the second build material to form a first substrate layer on the support member (block 604) and optionally ejects drops of the first build material to form a second substrate layer on the support member (block 608). The controller 128 operates the printheads 106A-106C and optionally 104A-104C to form the substrate layers on a region of the support member 102 that is separate from the region that supports the three-dimensional printed object 156. As depicted in FIG. 1 and FIG. 3, during process 600 the printer 100 forms stacks of substrate layers 172 and 176. The stack 172 includes substrate layers 310, 314, and 318 that are formed from the second build material to receive a printed pattern of the first build material. The printer 100 optionally forms the stack 176 with substrate layers 350, 354, and 358 that receive printed patterns of the second build material.

During the process 600, the printer 100 forms at least one substrate layer as the support member 102 moves past the print zone 110 in the process direction P prior to forming printed marks for a portion of a test pattern on the substrate layer, and continues to print additional substrate layers as required to prevent optical show-through (block 616). After the printer 100 forms a sufficient number of substrate layers (block 616), process 600 continues with formation of a portion of a first predetermined test pattern from the first build material on the substrate formed from the second build material (block 620) and optional formation of a portion of a second predetermined test pattern with the second build material on the substrate formed from the first build material (block 624). The printer 100 forms each portion of the first and second printed test patterns in a similar manner to the test pattern formation that is described above in process 500 regarding blocks 520 and 524, respectively, with the exception that the printer 100 uses the first and second types of build material instead of using a build material and a support material to form the substrate layers and printed test patterns.

Process 600 continues as the printer 100 generates scanned image data of the next portion of the first test pattern (block 628) and optionally generates scanned image data of the next portion of the second test pattern (block 632). In the printer 100, the image sensor 116 generates scanned image data of each portion of the top-most substrate layers and printed test pattern marks as the support member 112 moves past the image sensor 116 in the process direction P.

Process 600 continues with the processing described above in blocks 604-632 as the printer 100 forms the substrate stacks and portions of the first test pattern and optionally the second test pattern. The printer 100 also forms scanned image data of the portions of the first test pattern and optionally forms scanned image data of the portions of the second test pattern. When the printer 100 has completed the formation and scanning of the test patterns (block 636), the process 600 continues as the printer 100 performs a printhead registration and missing ejector detection process for the first printhead array 104A-104C using the scanned image data of the first test pattern (block 640). The printer 100 optionally performs the printhead registration and missing ejector detection process for the second printhead array 106A-106C using the scanned image data of the second test pattern (block 644). The controller 128 in the printer 100 subsequently adjusts the registration of printheads and performs missing ejector correction or compensation operations to correct any inoperable ejectors in the printheads (block 648).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A three-dimensional object printer comprising:
    a member configured to receive a build material and a support material on a surface thereof during a three-dimensional object printing process;
    a first printhead including a first plurality of ejectors, the first plurality of ejectors being configured to eject drops of the build material toward the member;
    a support material dispenser configured to provide the support material onto the member;
    an image sensor configured to generate scanned image data of the build material and the support material formed on the member; and
    a controller operatively connected to the first printhead, the support material dispenser, and the image sensor, the controller being configured to:
        operate the support material dispenser to form a first layer of the support material on a first region of the member that is separate from a region of the member where a three-dimensional object is being formed by the printer;
        operate the first plurality of ejectors in the first printhead to eject a portion of a first predetermined pattern of drops of the build material onto the first layer of the support material to form a first portion of a first test pattern;
        operate the image sensor to generate scanned image data of the first portion of the first test pattern on the first layer of the support material in the first region of the member;
        operate the support material dispenser to form an additional layer of the support material on the first region of the member over the first layer of the support material and over the first portion of the first test pattern;
        operate the image sensor to generate scanned image data of the additional layer of support material;
        determine whether the scanned image data of the additional layer of support material shows the first portion of the first test pattern through the additional layer of support material;
        if said determining indicates that the first portion of the first test pattern shows through the additional layer of support material, repeating each of said operating of the support material dispenser so as to form one or more further layers of the support material over the additional layer of support material, said operating of the image sensor so as to generate scanned image data of the one or more further layers of support material over the additional layer of support material, and said determining so as to determine whether the first portion of the first test pattern shows through the additional and the one or more further layers of support material, said repeating taking place until the first portion of the first test pattern does not show through the additional and one or more further layers of support material;
        operate the first plurality of ejectors in the first printhead to eject a portion of a second predetermined pattern of drops of the build material onto an uppermost layer of all of the additional and one or more further layers of the support material to form a second portion of the first test pattern;
        operate the image sensor to generate scanned image data of the second portion of the first test pattern; and
        after said generating of scanned image data of the second portion of the first test pattern, identify any inoperable ejector among the first plurality of ejectors in the first printhead using the scanned image data of the first portion of the first test pattern and the scanned image data of the second portion of the first test pattern.

2. The three-dimensional object printer of claim 1, wherein said identifying of any inoperable ejector among the first plurality of ejectors is conducted by recognizing the absence of a mark in the first test pattern that would otherwise correspond to a respective first printhead ejector for forming the absent mark, the respective first printhead ejector thereby constituting a missing first printhead ejector.

3. The three-dimensional object printer of claim 1, wherein the support material dispenser is a second printhead having a second plurality of ejectors, the second plurality of ejectors being configured to eject drops of the support material toward the member, the controller being further configured to:
operate the second plurality of ejectors in the second printhead to eject drops of the support material for forming the first layer of the support material on the first region of the member; and
operate the second plurality of ejectors in the second printhead to form all of the additional and one or more further layers of the support material.

4. The three-dimensional object printer of claim 3, further comprising:
a third printhead including a third plurality of ejectors, the third plurality of ejectors being configured to eject drops of the build material toward the member,
wherein the controlled is operatively connected to the third printhead and is further configured to:
operate the third plurality of ejectors in the third printhead to eject another portion of the first predetermined pattern of drops of the build material onto the first layer of the support material as part of forming the first portion of the first test pattern; and
operate the third plurality of ejectors in the third printhead to eject another portion of the second predetermined pattern of drops of the build material onto the additional and one or more further layers of the support material as part of forming the second portion of the first test pattern,
wherein said identifying of any inoperable ejector among the first plurality of ejectors in the first printhead is conducted by recognizing a registration error between a first plurality of marks of the first test pattern formed by the first printhead and a second plurality of marks of the first test pattern formed by the third printhead.

5. The three-dimensional object printer of claim 3, the controller being further configured to:
operate the first plurality of ejectors in the first printhead to form a first layer of the build material on a second region of the member that is separate from the first region of the member and the region where the object is being formed;
operate the second plurality of ejectors in the second printhead to eject a portion of a third predetermined pattern of drops of the support material onto the first layer of the build material on the second region of the member to form a first portion of a second test pattern;
operate the image sensor to generate scanned image data of the first portion of the second test pattern;
operate the first plurality of ejectors in the first printhead to form an additional layer of the build material over the first layer of the build material on the second region and over the first portion of the second test pattern;
operate the image sensor to generate scanned image data of the additional layer of the build material;
determine whether the scanned image data of the additional layer of the build material shows the first portion of the second test pattern through the additional layer of build material;
if said determining indicates that the first portion of the second test pattern shows through the additional layer of build material, repeating each of said operating of the first plurality of ejectors in the first printhead so as to form one or more further layers of the build material over the additional layer of build material, said operating of the image sensor so as to generate scanned image data of the one or more further layers of build material over the additional layer of build material, and said determining so as to determine whether the first portion of the second test pattern shows through the additional and the one or more further layers of the build material, said repeating taking place until the first portion of the second test pattern does not show through the additional and one or more further layers of build material;
operate the second plurality of ejectors in the second printhead to eject a portion of a fourth predetermined pattern of drops of the support material onto all of the additional and one or more further layers of the build material to form a second portion of the second test pattern;
operate the image sensor to generate scanned image data of the second portion of the second test pattern; and
identify any inoperable ejector among the second plurality of ejectors in the second printhead using the scanned image data of the first portion of the second test pattern and the scanned image data of the second portion of the second test pattern.

6. The three-dimensional object printer of claim 5, wherein said identifying of any inoperable ejector among the second plurality of ejectors in the second printhead is conducted by recognizing the absence of a mark in the second test pattern that would otherwise correspond to a respective second printhead ejector for forming the missing mark, the respective second printhead ejector thereby constituting a missing second printhead ejector.

7. The three-dimensional object printer of claim 5, further comprising:
a third printhead including a third plurality of ejectors, the third plurality of ejectors being configured to eject drops of the support material toward the member,
wherein the controller is operatively connected to the third printhead and is further configured to:
operate the third plurality of ejectors in the third printhead to eject another portion of the third predetermined pattern of drops of the support material onto the first layer of the build material as part of forming the first portion of the second test pattern; and
operate the third plurality of ejectors in the third printhead to eject another portion of the fourth predetermined pattern of drops of the support material onto the additional and one or more further layers of the build material as part of forming the second portion of the second test pattern,
wherein said identifying of any inoperable ejector among the second plurality of ejectors in the second printhead is conducted by recognizing a registration error between a first plurality of marks of the second test pattern formed by the second printhead and a second plurality of marks of the second test pattern formed by the third printhead.

8. The three-dimensional object printer of claim 3, the controller being further configured to:
operate the second plurality of ejectors in the second printhead as part of forming the additional and one or more further layers of the support material on the first region of the member, with a portion of the first layer of the support material being formed between a plurality of marks of the first portion of the first test pattern.

9. The three-dimensional object printer of claim 1, wherein the support material dispenser is a support material spreader configured to form the first layer of the support material and the additional and one or more further layers of the support material on the first region of the member.

10. The three-dimensional object printer of claim 9, the first printhead being configured to eject drops of the build material as a binder build material that hardens a first portion of the first layer of the support material as part of forming the first portion of the first test pattern and that hardens a second portion of an uppermost layer of the additional and one or more further layers of the support material as part of forming the second portion of the first test pattern.

11. The three-dimensional object printer of claim 1, the controller being further configured to:

between said forming of the first and second portions of the first test pattern, operate the first printhead and the support material dispenser to form a layer of the object.

\* \* \* \* \*